United States Patent
Haltermann et al.

(10) Patent No.: US 7,290,824 B2
(45) Date of Patent: Nov. 6, 2007

(54) SOFTTOP VEHICLE ROOF WITH A SEALING ELEMENT

(75) Inventors: Frank Haltermann, Heidenau (DE); Holger Zach, Burgau (DE)

(73) Assignee: CTS Fahrzeng-Dachsysteme GmbH, Hamburg (DE)

( * ) Notice: Subject to any disclaimer, the term of this patent is extended or adjusted under 35 U.S.C. 154(b) by 986 days.

(21) Appl. No.: 10/643,474

(22) Filed: Aug. 19, 2003

(65) Prior Publication Data

US 2007/0176461 A1    Aug. 2, 2007

Related U.S. Application Data

(63) Continuation of application No. PCT/EP02/14653, filed on Dec. 20, 2002.

(51) Int. Cl.
*B60J 7/00*    (2006.01)

(52) U.S. Cl. .................................. 296/107.04
(58) Field of Classification Search ......... 296/107.01, 296/107.04, 107.09
See application file for complete search history.

(56) References Cited

U.S. PATENT DOCUMENTS 6,189,950 B1    2/2001    Kawazoe

FOREIGN PATENT DOCUMENTS

| DE | 30 29 765 A1 | 3/1982 |
| DE | 42 28 184 C1 | 11/1993 |
| DE | 198 01 870 A1 | 7/1999 |
| DE | 299 16 352 U1 | 2/2000 |
| DE | 200 02 0780 U1 | 8/2000 |
| DE | 199 42 427 A1 | 3/2001 |
| DE | 299 16 383 | 6/2001 |
| DE | 299 23 087 U1 | 6/2001 |
| EP | 0 521 611 A1 | 1/1993 |

*Primary Examiner*—Lori L. Lyjak
(74) *Attorney, Agent, or Firm*—Klaus J. Bach

(57) ABSTRACT

In a soft top vehicle roof which is movable between a closed position and an open storage position and comprises a vehicle roof cover material which is supported by a roof linkage, at least one linkage element of the roof linkage is provided with a reception space in which a seal element and a material web connected to an end portion of the roof cover material are firmly engaged and form-fittingly locked by clamping hooks extending from the inner walls of the reception space through openings in the material web and into recesses in the seal element.

7 Claims, 2 Drawing Sheets

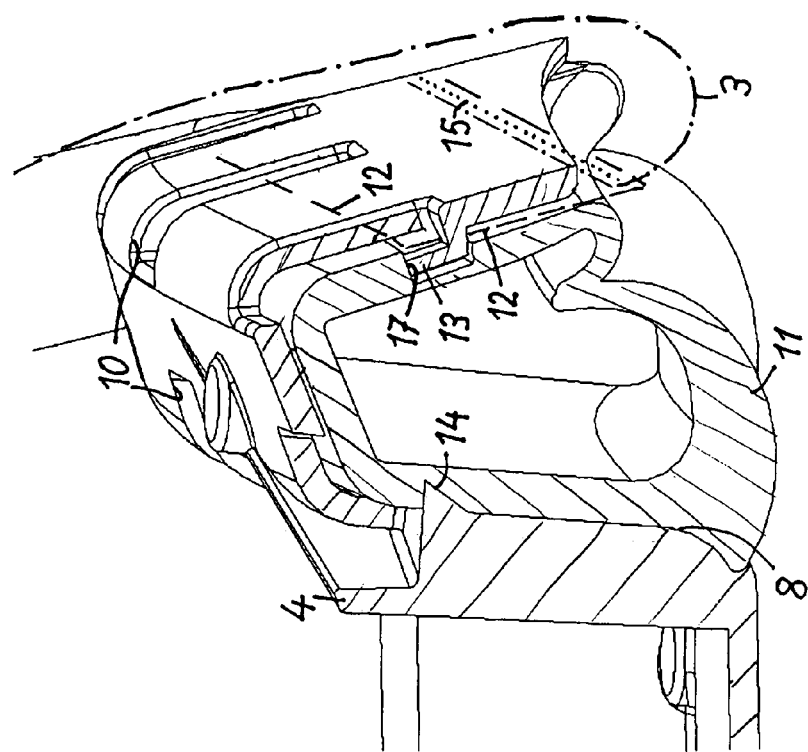
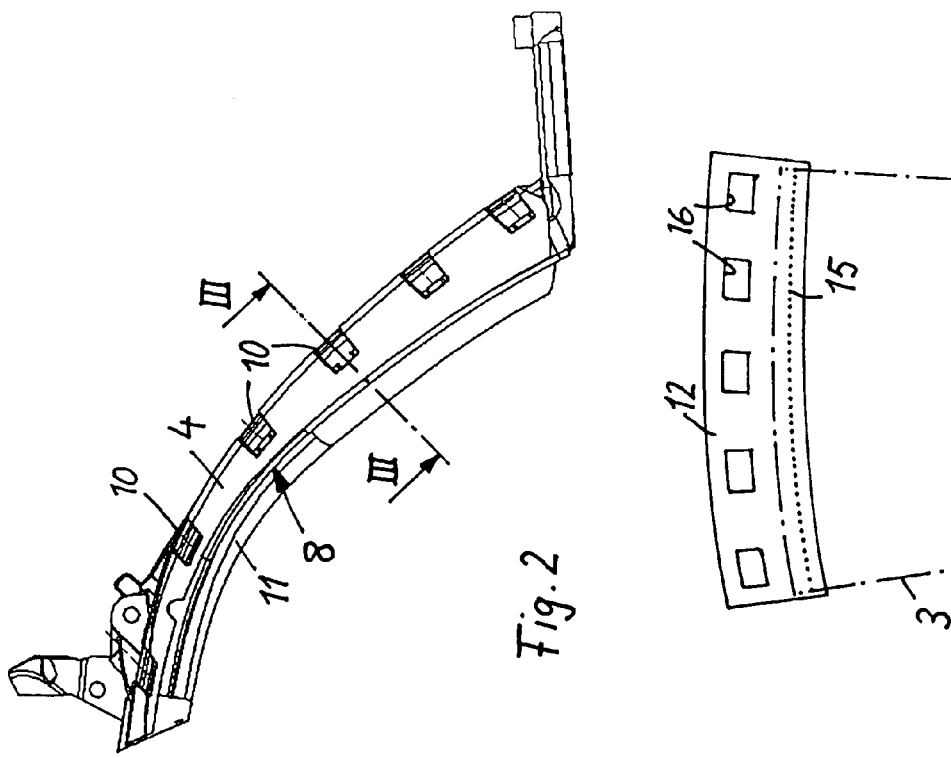
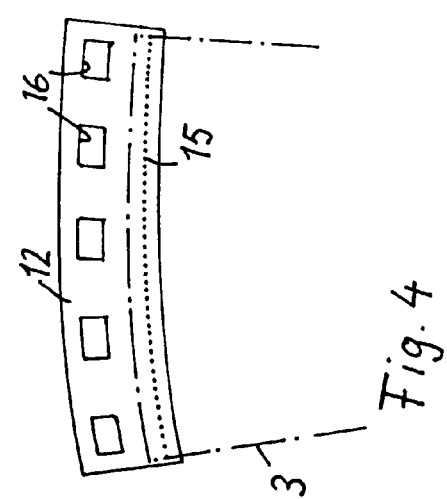

SOFTTOP VEHICLE ROOF WITH A SEALING ELEMENT

This is a Continuing application of international application PCT/EP02/14653 filed Dec. 20, 2002.

BACKGROUND OF THE INVENTION

The invention relates to a soft top vehicle roof with a sealing element wherein the soft top vehicle roof material is supported by a support linkage and is movable between closed and open positions, the sealing element and the soft cover material being engaged together by a part of the support linkage.

Such vehicle soft top roofs include a movable rooftop support linkage and a roof cover material which is tensioned over, and supported by the support linkage. The roof can be moved between a closed position in which a front roof yoke of the roof linkage is locked to a windshield frame and an open storage position in which the soft top is deposited in a rear storage compartment. In order to provide, in the closed position of the roof, for a water-and wind-tight connection between the side windows and the roof section framing the upper and side edges of the side windows, sealing elements are provided which are firmly connected to the roof and which are engaged by the adjacent edges of the side windows when the windows are closed. Generally, the seal elements are screwed to the respective linkage components at a plurality of screw locations distributed over the length of the seal element so as to provide for a secure connection of the seal element to the vehicle roof.

Care must be taken in such arrangements that stresses on the seal elements caused by the opening and closing of the roof or by the operation of the side windows will not result in damages to the seal elements by causing fractures for example. In the area of the screw connections point-like loads are effective on the seal element which cause local stress peaks that generally increase the danger for damage. The screw connections also result in relatively high assembly expenses.

A similar seal element is also disclosed in the printed publication DE 198 01 870 A1. In this case, a profiled rail is incorporated into the seal element which improves the load carrying capability of the seal element and which results particularly in a uniform area loading of the seal material when screwed to the roof part. In this arrangement, the local stresses are reduced but, because of the screw connections, the mounting of the sealing element to the respective roof part is still time-consuming and expensive.

It is furthermore pointed out that, in a soft top roof, the roof cover material must also be connected to the side areas of the roof. Care must be taken that the connections for the roof cover material and the seal elements do not interfere. Also, the mounting of the roof cover material involves substantial mounting efforts and expenses.

DE 30 29 765 A1 discloses an arrangement wherein a seal element cooperating with a side window is form-fittingly supported in a linkage component of the vehicle roof. The sealing element is clamped in a reception space which is formed by side walls having inwardly bent front edges which extend into grooves formed correspondingly in the seal element so that half of the seal element is contained in the reception space and half projects from the reception space. This seal element basically does not require a screw connection. However, the efforts and expenses for the mounting of the vehicle roof cover material are not reduced thereby.

DE 42 28 184 C1 discloses an arrangement wherein the vehicle roof cover material of a soft top vehicle roof is connected to a linkage part of the roof linkage by means of profile rail and a seal element. The linkage part has two ledges facing each other and delimiting a reception space into which a portion of the seal element extends when the seal element is mounted to the linkage part. The roof cover material is cemented onto the profile rail, which extends in a form-fitting manner into the area behind one of the ledges. The seal element is provided with recesses corresponding to the ledges to facilitate the installation of the seal element in the reception space and provide for a form-fitting engagement of the seal. When the seal is mounted, the profile rail is biased by the seal element into engagement with the respective ledge and in this way is retained by the ledge in a form-locking manner.

DE 42 28 184 C1 discloses an arrangement wherein the seal element is profiled and engages and retains a profiled rail including the roof cover material connected thereto over a certain length. In order to safely prevent the unintended release of the profile rail and or the seal, it is necessary that the ledges on the linkage part extend far into recesses in the seal portion received in the reception space whereby however the mounting of the seal element becomes substantially more difficult.

It is the object of the present invention to provide a soft top vehicle roof with a seal element whereby the roof cover material as well as the seal element can be connected to the respective roof part with relatively small efforts and mounting expenses. Expediently, the stresses effective on the roof cover material and the seal element resulting from the connection to the vehicle roof part should be as small as possible.

SUMMARY OF THE INVENTION

In a soft top vehicle roof comprising a vehicle roof cover material which is supported by a roof linkage part and is movable between a closed position and an open storage position, at least one linkage element of the roof linkage is provided with a reception space in which a seal element and a material web connected to an end portion of the roof cover material are firmly engaged and form-fittingly locked by clamping hooks extending from the inner walls of the reception space through openings in the material web and into recesses in the seal element.

The roof cover material is clamped together with the seal element in a form-locking manner into a reception space in a linkage part of the roof linkage. In this way, the roof cover material as well as the seal element can be mounted exclusively by means of a form-locking connections in the linkage part without the need for screws, rivets, cement or similar connecting means. This has the advantage that the seal element as well as the roof cover material can be rapidly mounted and local stress peaks can be avoided in the seal element and also in the roof cover material, since, by way of a form-locking connection a more uniform force transfer is achieved. Since the roof cover material and the seal element extend into a common reception space, essentially no additional efforts or expenses are required for forming the reception space in the linkage components over the efforts and expenses of conventional mounting arrangements. In principle, it is now sufficient to provide on the linkage element form-locking elements for the clamping engagement of the roof cover material and the seal element, which form-locking elements are formed preferably integrally with the linkage parts engaging the roof cover material and the seal elements.

The form-locking elements comprise expediently at least one clamping hook which is disposed in the reception space and which extends behind a portion of the seal element or the roof cover material or both in a form-locking manner.

It may be expedient in this connection if only the seal element is engaged by the clamping hook in a form-locking manner and the roof cover material is engaged between the inner wall of the reception space or otherwise connected to the sealing element in a form-locking manner without being directly in contact with the clamping hook. But the clamping hook may engage the seal element as well as the roof cover material in a form-locking manner. Expediently, several clamping hooks are provided which are arranged distributed over the length of the connecting area in order to provide for a uniform force transfer. The clamping hooks may engage only the seal element only, the roof cover material or both. The clamping hooks may also be arranged at opposite inner side walls in order to engage the roof cover material and the seal element from opposite sides. It may furthermore be advantageous to provide a form-locking element, which extends over the full length of the connection behind the seal element and/or the roof cover material in a form-locking manner.

The top cover material is preferably connected to a material web, which extends into the reception area in a form-locking manner and is locked therein. The material web consists expediently of plastic material and, particularly, has a greater strength and rigidity than the roof cover material, so that also localized force transfers into the material web are uniformly distributed over the length of the material web and to the cover material connected to the material web. The material web can be directly connected to the clamping hooks, which project for example into openings in the material web and/or the sealing element is disposed behind the material web. For a space saving arrangement, it may be expedient to provide on the sealing element a step corresponding to the thickness of the material web on which the material web is supported when mounted, particularly at the outside of the seal at the side facing the inner wall of the reception space.

The invention will become more readily apparent from the following description of a preferred embodiment thereof on the basis of the accompanying drawings.

BRIEF DESCRIPTION OF THE DRAWINGS

FIG. 2 shows a C-column of a vehicle roof with the soft top detached, FIG. 3 is a cross-sectional view taken along line III-III of FIG. 2, and FIG. 4 shows schematically a material web to which a top cover material has been sewn.

DESCRIPTION OF A PREFERRED EMBODIMENT

Figure 1:
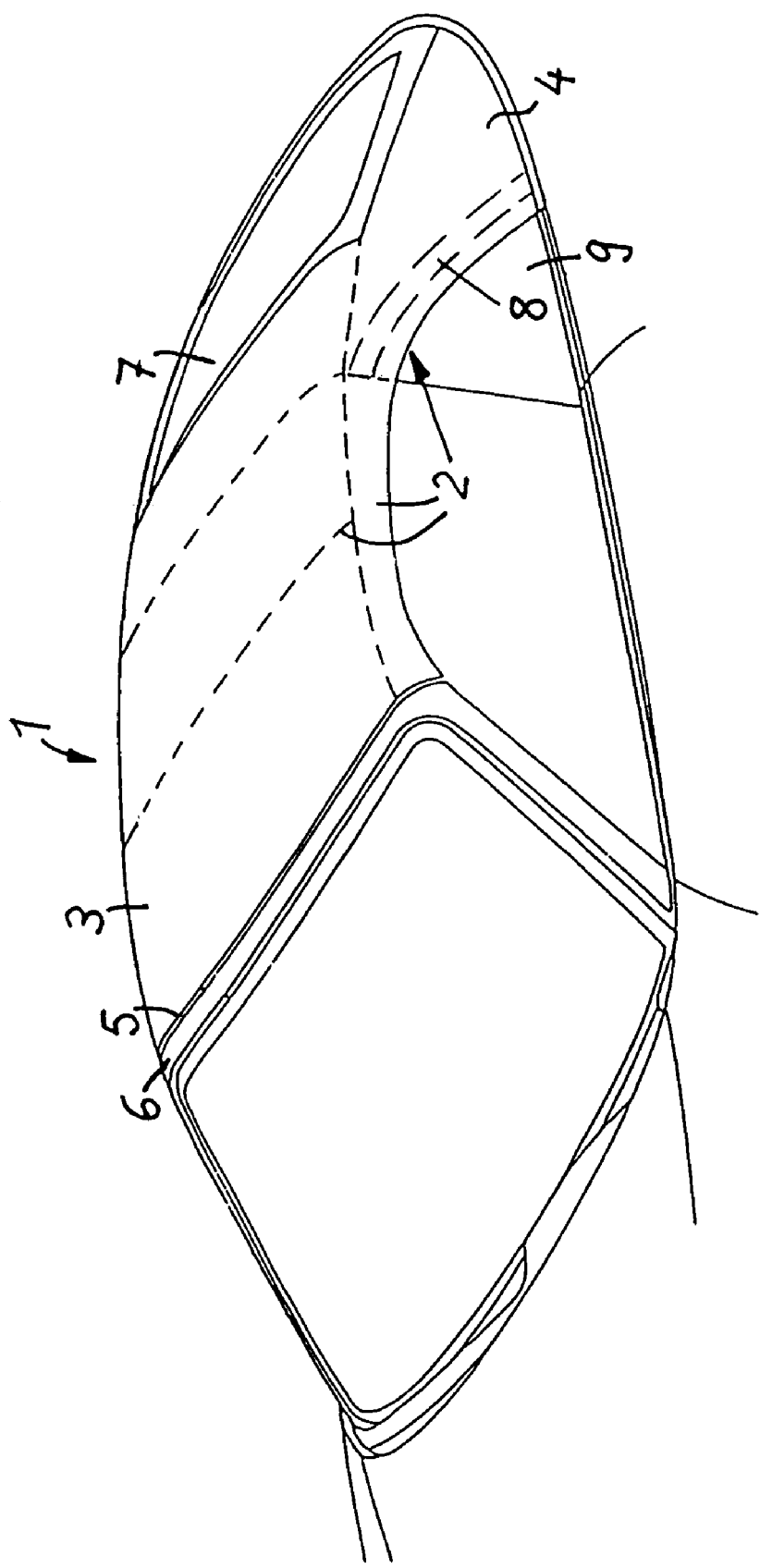
FIG. 1 is a perspective view of a soft top vehicle roof in closed position whose rear C-column includes a groove-like reception space for accommodating a seal element and a material web.

In the figures, identical components are designated by the same reference numerals.

The vehicle roof 1 shown in FIG. 1 is a soft top vehicle roof which includes a roof top cover material 3, that is, supported by a plurality of individual movable linkage components including rear end C-columns 4. The vehicle roof 1 is movable between the shown closed position wherein a front roof section 5 is connected to a windshield frame 6 and an open storage position, in which the vehicle roof 1 is deposited in a rear storage compartment of the vehicle.

The roof cover material encompasses, with the exception of the area of a rear window 7, the whole top side of the vehicle roof 1 including the side linkage parts. In the C-columns 4, a groove-like reception space 8 is provided which is open down-wardly toward the vehicle body and which is adapted to accommodate and retain the edge areas of the top cover material 3 and also a seal element, on which the upper edges of the rear side windows 9 abut when the vehicle roof 1 is closed. The reception space 8 extends essentially over the length of the C-column 4 essentially parallel to the side edge of the C-column facing the rear side window 9.

As shown in FIG. 2, the C-column 4 is arched with the reception space 8 being arranged at the inner end of the arch. In the reception space 8, a seal element 11 is disposed in a form-locking manner. No additional measures are provided for mounting the seal element 11 in the reception space 8. At the outside, a number of openings 10 are provided which are distributed over the length of the C-column 4 and which are arranged at the inside of the C-column. Each opening 10 of the C-column is provided with a clamping hook, which extends behind the seal element 11 in a form-fitting manner.

The clamping hooks are shown in FIG. 3 and designated by the reference numerals 13 and 14. The clamping hooks 13 and 14 disposed on opposite inner walls in the reception space 8 extend in a form-locking manner into grooves or respectively, behind steps formed in the adjacent outer walls of the seal element 11.

The clamping hooks 13 at one of the inner walls of the reception space 8 also extend in a form-locking manner behind a material web 12 which is connected to the roof cover material 3 shown in FIGS. 3 and 4 in dash-dotted lines. The roof cover material 3 extends from the material web 12 over the outside of the C-column. The material web 12, which consists preferably of a plastic material, is arranged between one of the outer walls of the seal element 11 and the respective inner wall of the reception space 8. The respective clamping hook 13 extends behind the material web 12 and the seal element 11. To this end, the material web 11 has openings 16, through which the clamping hooks 13 extend. Into the outside wall of the seal element 11, a step 17 is formed on which the front side of the clamping hook 13 and also the outer edge of the material web 12 abut.

The form-locking elements represented by the clamping hooks 13 and 14 lock the seal element 11 and the material web 12 in a form-fitting manner to the column 4 so as to prevent their unintended release from the reception space 8 in the column 4.

What is claimed is:

1. A soft top vehicle roof (1) movable between a closed position and an open storage position, comprising a vehicle roof cover material (3) supported by a roof linkage (2, 4), said roof linkage (2, 4) including at least one linkage element (4) provided with a reception space (8) extending along one side thereof, a seal element (11) supported in said reception space (8) together with an edge portion of said roof cover material (3), said linkage element (4) being provided with clamping hooks (13, 14) projecting into said reception space and said roof cover material (3) being provided with a material web (12) extending along said edge of said roof cover material (3) and having openings (16) and said seal element (11) having recesses and steps (17), said seal element (11) and said material web (12) being received in said reception space (8) with said clamping hooks (13, 14) extending through said openings (16) in said material web (12) and into said recesses (17) and behind said steps for firmly engaging said seal element (11) and said material web (12) in said reception space (8) in a form-locking manner.

2. A soft top vehicle roof according to claim 1, wherein one set of clamping hooks (13) is arranged along one inner side wall of said reception space (8) and another set of clamping hooks (14) is arranged along the opposite inner side wall of said reception space (8).

3. A soft top vehicle roof according to claim 1, wherein said material web (12) is engaged between an outer side wall of said seal element (11) and an inner side wall of said reception space (8).

4. A soft top vehicle roof according to claim 1, wherein said material web (12) abuts a ledge (17) extending along the outer side wall of said seal element (11).

5. A soft top vehicle roof according to claim 1, wherein said material web (12) consists of a plastic material.

6. A soft top vehicle roof according to claim 1, wherein said roof cover material (3) is sewn to said material web (12).

7. A soft top vehicle roof according to claim 1, wherein said reception space (8) for the form-locking engagement of said seal element (11) and said roof cover material (3) is formed in C-columns (4) of said vehicle roof.

\* \* \* \* \*